United States Patent [19]

Fosher

[11] 4,141,170
[45] Feb. 27, 1979

[54] ARTIFICIAL FISHING LURES AND PROCESS FOR MOLDING SAME

[76] Inventor: Donald H. Fosher, 212 S. Bemiston, St. Louis, Mo. 63105

[21] Appl. No.: 810,964

[22] Filed: Jun. 29, 1977

[51] Int. Cl.² ............................................. A01K 85/08
[52] U.S. Cl. ................................... 43/42.24; 43/42.27
[58] Field of Search ................. 43/42.09, 42.27, 42.47, 43/42.24

[56] References Cited

U.S. PATENT DOCUMENTS

| | | | |
|---|---|---|---|
| 1,457,926 | 8/1923 | Dunkelberger | 43/42.09 |
| 2,462,828 | 2/1949 | Parnell, Sr. | 43/42.09 X |
| 2,502,879 | 4/1950 | Nikander | 43/42.47 X |
| 2,994,982 | 8/1961 | Murawski | 43/42.09 X |
| 3,883,979 | 5/1975 | Williams, Jr. | 43/42.53 |
| 3,986,291 | 10/1976 | Hopper | 43/42.09 X |

FOREIGN PATENT DOCUMENTS 1309397  10/1962  France ................................ 43/42.27

*Primary Examiner*—Nicholas P. Godici
*Assistant Examiner*—K. J. Ramsey

[57] ABSTRACT

For use with a conventional type jig head resembling the head of a minnow or other natural prey, a fishing lure molded integrally of a resilient material has a body, with a forward extending transition flap and a wing portion. These bend upward over the front end of the body and backward to form a movable wing. As assembled, the hook of the jig head penetrates and anchors the folded transition flap against the body; and its projecting hook emerges at the top of the body and passes through an opening in the wing.

A method of integrally molding the body and wing in two colors is disclosed in which a deeper mold cavity portion is used to form the body of the lure and a shallower mold portion contiguous with it forms the transition flap and wing. Moldable material of one coloration fills the deeper cavity portion and is allowed to partially cure or set. Due to its viscosity it spreads only slightly into the shallower mold portion; then plastic of a second coloration is poured thereupon to fill the remainder of the mold cavity. The moldable material sets by baking, or the like, and the lure is removed from the mold. On assembly, the color transition region is substantially concealed from view, thus presenting a lure with a body and wings of different colors.

3 Claims, 3 Drawing Figures

ARTIFICIAL FISHING LURES AND PROCESS FOR MOLDING SAME

BACKGROUND OF THE PRESENT INVENTION

A class of scarab-type fishing lures, designed so as to resemble a bottom-swimming minnow, frog, or insect, are commonly molded in one piece incorporating various anatomical details such as wings, fins, etc. So molded, however, such anatomical parts are presented in fixed position and thus lack realism. Because such lures are molded in a single cavity mold, they are conventionally of one color and one type of material.

It is well known, however, that fish are attracted to lures displaying vivid multi-coloration and characteristic movements resembling those of naturally-occurring prey. Recently, it was discovered that fish are further strongly attracted to objects which emit bubbles of air. For example, a fishing lure which has enjoyed considerable success in marine fishing is a squid-like structure with trailing tentacle-like appendages which emit a trail of bubbles in the water. However, with many fresh water fish, trailing appendages tend to produce the so-called short-strike phenomenon, in which fish strike at the lure at a point remote from the setting hook.

SUMMARY OF THE INVENTION

A principal object of the present invention is to provide an integrally molded fishing lure for use with conventional tackle which combines the strength and economy of unitary molding with the realism of moving parts. A second object is to provide a method of integral molding in which different regions of the lure body, corresponding to the principal anatomical parts of simulated prey, may display different colors or have a different composition of material.

Briefly summarizing, the lure of the present invention is adapted for use with a conventional type of jig head. The preferred embodiment comprises an integrally molded body structure of three parts including a body portion, a transition flap extending forwardly from the forward lower edge of the body portion, and a flared wing portion extending forwardly from the transition flap.

On assembly the transition flap which is of a length substantially equal to the forward planar surface of the body portion, is bent upwardly 90° and secured fixedly between the aft surface of the jig head and the planar forward surface of the body portion. The wing portion then bends backward over the body portion. Thus, a wing portion molded as a forward extending structure becomes a backwardly projecting wing which readily flaps upon movement through the water due to its great resiliency.

The forwardly-projecting upward-curving hook of the jig head is partially embedded through the transition flap and body portion, thereby anchoring the jig head against the forward surface of the body portion. In such position the upwardly curved portion of the hook, including the barb, protrudes from the upper surface of the body portion.

The protruding hook portion passes through an opening along the fore-and-aft line of symmetry, preferably extending from the wing tip to a position forward of the hook. The wing portion is thereby partially guided by the hook, which is of a smaller diameter than the opening.

In the hand-poured molding process of the present invention, the mold utilized has a deeper cavity portion corresponding to the shape of the body portion and a shallow second cavity portion contiguous therewith corresponding to the combination of the wing transition flap and portions. A plastic or other material is filled first into the deeper cavity portions. Significantly, the plastic so filling this cavity portion may be poured to the top of the mold, its surface tension properties effectively preventing a large amount of flow into the contiguous shallow cavity portion.

For forming a fishing lure of two different colors, the molding process comprises the principle steps of: filling molding material of one color into the mold deeper cavity portion to the top of the mold to form the body portion from which only a small amount of plastic flows into the shallower portion corresponding to the transition flap, partially curing, and then filling a material of a second color into the shallower cavity portion to form both the transition flap and the wing portions.

DESCRIPTION OF THE PREFERRED EMBODIMENT

Figure 1:
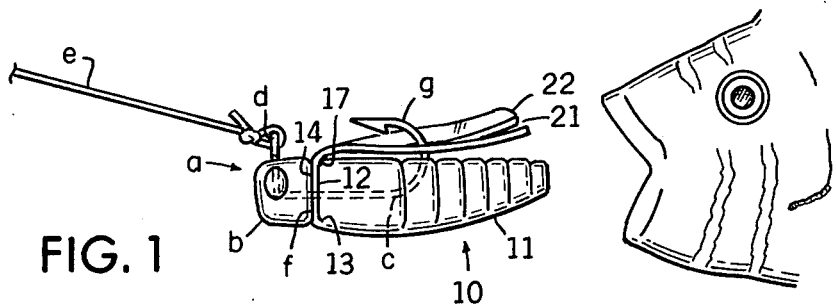
FIG. 1 is a side elevation of a fishing lure embodying the present invention shown assembled onto a jig head and in use.

The preferred embodiment of the present invention is adapted for use with one type of conventional jig head, generally designated a, characterized by a weighted head portion b having an aft surface f through which projects an upwardly and forwardly curved barbed hook c. The jig head a is further provided with a hookeye d, attachable to a leader e (FIG. 1). In use, the jig head a sinks rapidly to the bottom of a lake or stream.

Figure 2:
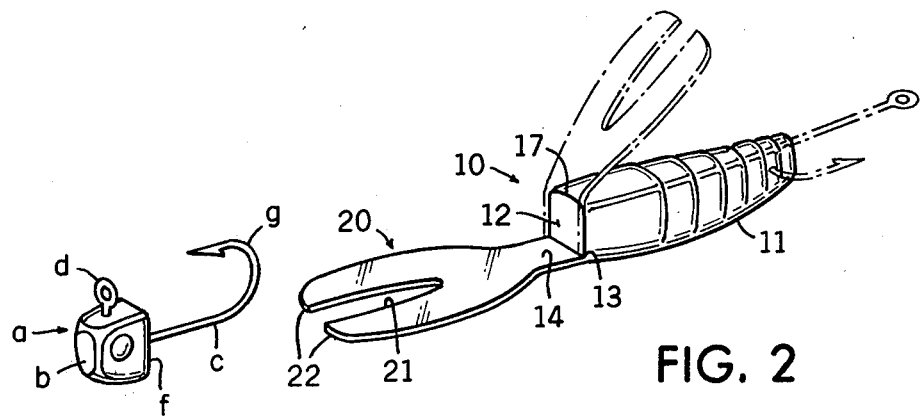
FIG. 2 is an exploded perspective view of the lure of FIG. 1 prior to assembly. The phantom lines show the transition flap portion between the body and wing portions bent upward and wing portion bent partly aft, preparatory to assembly.

Referring now to FIG. 2, the present invention is illustrated as a somewhat elongated integrally molded structure generally designated 10 comprising essentially three parts. A body portion 11, whose configuration suggests that of natural prey for the fish sought, is molded of a resilient material as herinafter described. The body portion 11 has a planar forward surface 12. Molded to extend forward from its forward lower edge 13 is a thin transition flap 14 whose length is substantially equal to the depth of the body portion 11.

Molded to extend forward of said transition flap 14 is a thin wing portion, generally designated 20 whose width is preferably flared and of a length substantially equal to the length of said body portion 11. In the preferred embodiment, the wing portion 20 has an opening 21 leading along the longitudinal plane of symmetry from the wing tip 22 and whose width is greater than that of the shank of the barbed hook c of said jig head a.

For assembly with a jig head a, the transition flap 14 of the present invention is bent upwardly at substantially 90°, as best shown in FIG. 2 in phantom lines so that it may be pressed along its entire length against the planar forward surface 12 of said body portion 11. Then the wing portion 20 is bent backwards over the forward upper edge 17 of said body portion 11 thereunder. The transition flap 14 and the wing portion 20 are sufficiently thin and of sufficiently resilient material so as to permit movement resembling the flapping of an insect wing or the pectoral fins of a minnow.

Figure 3:
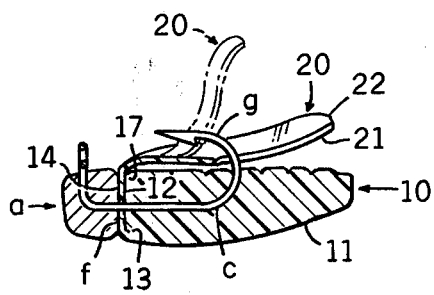
FIG. 3 is a sectional view of the assembled lure of FIG. 1 as would be seen along a vertical-longitudinal central plane. A typical flapping motion is indicated in phantom lines.

Referring now to FIG. 3, the forwardly and upwardly curved barbed hook c of the jig head a, on assembly with the present invention, is pressed backward through the upwardly folded transition flap 14 and into said body portion 11, to emerge through its upper surface. This firmly secures the transition flap 14 sandwich-like between the aft surface f of the jig head and the planar forward surface 12 of the body portion 11.

A portion g of the barbed hook c thus protrudes upwardly from said body portion 11 as best shown in FIG. 3. This permits the wing portion 20 to flap against the body portion 11, partially guided by the upwardly protruding portion g of the hook c.

Because the lure 10 is molded integrally, its transition flap portion 14 cannot rotate about the shaft of said barbed hook c to cause misalignment of the wing portion and thus interference with its movement. The wing portion 20 thus does not bind when guided by the shank of the hook c. Additionally, integral molding provides strength which prevents tearing of the delicate wing portion upon flapping.

The construction described lends itself to being molded with different colorations for the body and the wings, preferably using a hand-pour oven curing process.

The mold cavity is provided with a first cavity portion corresponding to the shape of the body portion 11 and a contiguous second shallower cavity portion corresponding to the transition flap 14 and the wing portion 20. In the method of the preferred embodiment, a plastic of one coloration is introduced into the deeper first cavity portion and fills it to the top of the mold. The viscosity of the plastic is sufficient to restrict overflow into the contiguous second shallower cavity portion. Such insubstantial overflow as occurs is confined effectively to that part of the shallower cavity portion which corresponds to said transition flap 14. The plastic so introduced is then partially cured, preferably by heat, but not so completely as to prevent merging of plastic thereafter introduced into the remaining part of the shallower cavity portion. Then plastic of a second coloration is introduced to fill the remaining cavity of the mold. As here used, the term "coloration" is used to mean any visually differentiable characteristic; for instance, the addition to a base color of shimmering specks, etc. Thereafter the moldable material is allowed to set by chemical reaction, curing, baking or the like; and finally, the lure is removed from the mold. Adaptation of the present method of molding to conventional techniques of injection molding will be apparent to those skilled in the art.

As assembled, with the jig head a, the region of color transition between the body portion 11 and the wing portion 20 is the transition flap 14, sandwiched concealedly between the aft surface f of said jig head portion b and the planar surface portion 12 of said body portion 11. The lure as assembled thus presents a body portion 11 of one coloration and a wing portion 20 of a different coloration.

In the preferred embodiment the molded structure 10 of the present invention is made of a resilient plastic, preferably plasticized polyvinyl chloride of a Shore A rating of about 10. So molded, lures of different sizes and colors may be used interchangably with the same jig head a. The self-healing properties of the preferred plastic composition permit retraction of the hook c without substantial tearing so that the lure may be re-used. This is particularly advantageous to the fisherman who can easily and quickly change lures without detaching the line or changing the leader.

Other resilient materials are contemplated by the present invention, such as soft rubber, in various sizes, shapes and colors as will be apparent to those skilled in the art.

However, in the preferred use, as illustrated in FIG. 1, the present lure is designed to attract bottom or sub-surface feeding fish of species including crappie, bass, walleyed pike, trout, and various pan fish.

When the line is free, the assembled lure dives to the bottom; the relative buoyancy of the plastic molded lure structure 10 causes it to float above the weighted jig head. On slight jerking of the line, the lure will resemble a minnow or insect probing at bottom-lying objects or vegetation.

Fish are particularly attracted to a source of bubbles. Flapping movement of the wing portion 20 which accompanies such small jerks will dislodge entrapped bubbles of air. The flapping movement is accomplished as follows:

The elasticity of the material tends to raise the wing portion 20 above the body portion 11, whereas forward movement through the water tends to deflect the wing portion 20 downward against the body portion 11. Alternation of the deflections will follow from such jerking movement. As shown in phantom line in FIG. 3, as such deflections alternate, the flapping movement of the wing portion 20 relative to the body portion 11 will be somewhat guided, as well as restrained by the sliding of the opening 23 against the upward and forward protruding portion g of the shank of the hook. For greater restraint, the wing portion 20 may be stretched slightly and the barb of protruding hook portion g may be pressed through it immediately forward of the wing opening 23. The wing portion 20 will then flap from the position shown in phantom lines in FIG. 3.

Another important advantage of the present lure is the positioning of the hook at the center of the movable portion which attracts the fish. Prior art lures, in which the movable or otherwise attracting portions trail the hook, often result in short strikes, in which the fish expels the lure before the hook is set. The present invention eliminates this short strike phenomenon because the hook is strategically positioned at the center of the strike zone.

A unique use of the present molded lure is that in fishing for certain species, it may be advantageous to employ a lure with a trailing portion. In such instances the present lure may be used without a jig head by simply hooking a simple hook (as shown in phantom lines FIG. 2) through the aft end of the body portion 11 and trailing it backwards. In this use the transition flap will give added length as the lure trails with the body portion first, then the transition flap and finally the wing portion.

I claim:

1. For use with a jig head having an aft surface through which projects the shank of an upwardly and forwardly curving hook,
   a fishing lure molded integrally of resilient material and comprising
   a body portion and
   a wing portion,
   characterized in having a transition flap portion connecting said body and wing portions, said transition flap portion extending from the lower edge of the forward surface of said body portion,
   the length of said transition flap portion being equal to the depth of the forward surface of said body portion,
   whereby on assembly with such jig head said transition flap portion may be bent upward adjacent said forward surface and secured between the aft surface of said jig head and the forward surface of said body portion.

2. The fishing lure of claim 1 wherein
   said wing portion has a fore-and-aft line of symmetry in an opening therealong,
   whereby to pass over the shank of such hook and to partially guide said wing portion on flapping.

3. For use with a jig head having an aft surface through which projects a shank and upwardly and forwardly curving hook,
   a fishing lure comprising
   a body portion,
   an integral resilient junction adjacent to the forward edge thereof,
   a wing portion projecting therefrom along the upper surface of the body portion and having
   a fore-and-aft line of symmetry and
   an opening therealong,
   whereby the wing portion may flap against the body portion thereunder partially guided by such hook.

* * * * *